J. F. KEMP.
VEHICLE WHEEL.
APPLICATION FILED NOV. 23, 1917.
1,267,082.
Patented May 21, 1918.
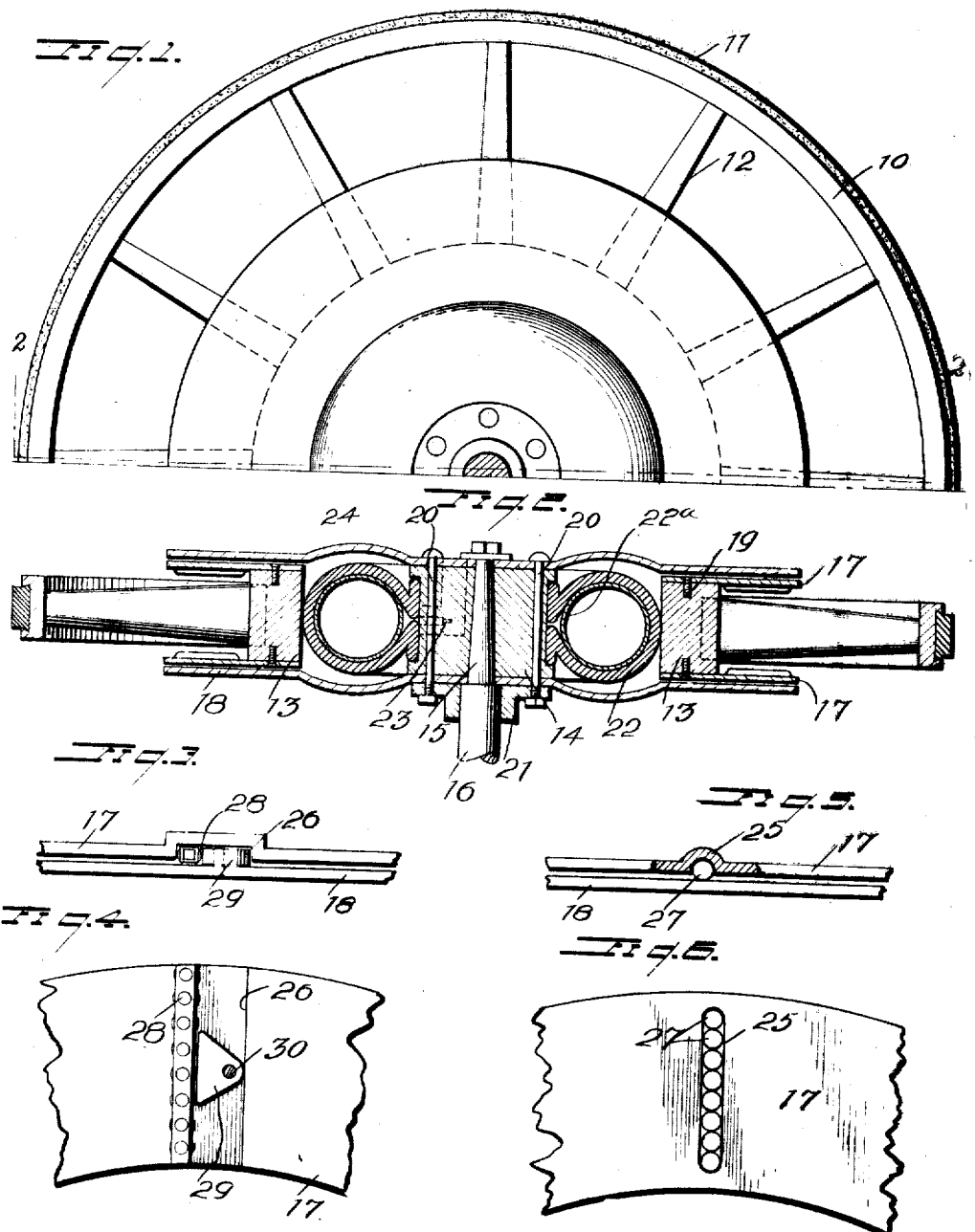
WITNESSES
INVENTOR
JAMES F. KEMP,
BY
ATTORNEYS

UNITED STATES PATENT OFFICE.

JAMES FINLEY KEMP, OF MANILA, PHILIPPINE ISLANDS.

VEHICLE-WHEEL.

1,267,082.

Specification of Letters Patent.

Patented May 21, 1918.

Application filed November 23, 1917. Serial No. 203,581.

*To all whom it may concern:*

Be it known that I, JAMES FINLEY KEMP, a citizen of the United States, and a resident of Manila, in the Philippine Islands, have invented a new and useful Improvement in Vehicle-Wheels, of which the following is a specification.

My present invention relates generally to vehicle wheels, and more particularly to a novel construction thereof embodying relatively movable parts whereby to bring about resilient support of a vehicle in use, and between which parts an inflatable tube is interposed, of greatly reduced cross section and circumference with respect to the usual inflatable tube at the tread of a wheel, in order to bring about a great many obvious advantages including saving in the amount of materials used in the construction of the usual inflatable tire; saving in the materials entering into the construction of bolts, nuts, clamps, and like attachments in connection with detachable and demountable rims; elimination of all punctures and abrasions of the usual inflatable tires; reduction of the cost of upkeep and overhead charges of maintenance; practical elimination of all work and labor incident to the frequent repair of punctures, blow-outs, and the like as well as vulcanization of inner tubes and shoes.

The construction provided by my invention aims to accomplish these advantages and still provide for flexible support against shocks and vibration, and for comfort and safety in the transportation of commodities and humans, in a manner equally as effective as the ordinary wheel having an inflatable tire.

In its specific aspect, my invention resides in the features of construction, arrangement, and operation to be now described in connection with the accompanying drawings forming a part of this specification, and illustrating the at present preferred form.

In this drawing:

Figure 1 is a side view of the upper half of a wheel constructed in accordance with my invention.

Fig. 2 is a horizontal section taken substantially on line 2—2 of Fig. 1.

Fig. 3 is an edge view of a portion of certain of the side plates.

Fig. 4 is an inner face view of a portion of one of the inner side plates.

Fig. 5 is a view similar to Fig. 3, though partly broken away and in section, of another portion of the same plates, and Fig. 6 is a view similar to Fig. 4 looking at the inner face of another portion of one of the plates.

Referring now to these figures, the wheel provided by my invention includes a felly 10 having a solid tire 11, if any, and having inwardly projecting radially disposed spokes 12, the latter connected at their inner ends to a hub ring 13, disposed in annularly spaced relation with respect to the main solid hub 14, the latter of which has an axial opening adapting it to the reception of the spindle 15 of an axle or shaft 16.

To the hub ring 13 are secured the inner edges of a pair of inner annular side plates 17, disposed one at each side of the said hub ring, with their outer portions projecting beyond the hub ring as clearly seen in Fig. 2, and with their outer faces, that is their faces farthest removed from the hub ring 13, in close though movable relation with respect to the outer portions of a pair of circular outer side plates 18, which latter are rigidly secured at their central portions to the opposite side faces of the central rigid hub 14.

The connection of the inner side plates 17 with the hub ring 13 may be effected in any suitable manner, as by means of bolts or screws 19, and similarly, the connection of the outer side plates 18 with the main central hub 14 may be effected in any suitable manner, as by means of bolts, 20, which may be also utilized to secure an inner circular collar and the like 21 which may in use support a brake band.

The peripheral face of the main central hub 14 may be suitably grooved or recessed to receive the base flanges of an inflatable tube, to occupy the annular space between the said hub and the hub ring 13, and which tube may consist of an inner casing 22ᵃ and an outer shoe 22, and may have its filling valve 23 projecting into a radial opening of the hub 14 in turn communicating with a longitudinal bore parallel with its axis and opening at the outer side of the wheel, as indicated in dotted lines in Fig. 2.

In order to better accommodate the tube in its action resiliently supporting the hub ring 13 and the felly 10, those portions of the outer side plates 18 extending between the hub 14 and the hub ring 13 in the normal position of these parts, may be swelled or bulged outwardly as seen at 24, so as to thus better accommodate the sides of the inflatable tube when the latter is compressed in use.

To better enable and permit relative movement of the inner side plates 17 with respect to the outer side plates 18, said inner plates 17 may be provided at spaced points with radially extending depressed portions 25 and 26, each forming outer radial groves, in certain of which, as for instance the radial grooves 25 of Figs. 5 and 6, may be disposed anti-friction members in the nature of balls or rollers 27 arranged to engage the inner faces of the outer side plates 18.

In certain others of the grooves, as for instance the grooves 26, a series of balls 28 may be disposed at one side, for engagement by means of shiftable propelling blocks 29 pivotally mounted upon pins 30 extending inwardly from the outer side plates 18, said propelling blocks 29 engaging the series of balls 28 in shifting relation so as to rotate the hub ring 13 and its parts simultaneously with the rotation of the main hub 14, and vice versa, and being shiftable on their pivots 30 so as to automatically seat themselves in flatwise relation against the series of balls 28 at all times, irrespective of angular displacements brought about by shifting movement of the hub ring with respect to the main hub in use.

It is obvious from the foregoing that the construction provided by my invention is well calculated to carry out the various objects of the invention first above mentioned, and will enable operation of a wheel substantially as described, without necessitating contact of the inflatable tube with the ground, and with minimum of friction between the movable parts at all times.

I claim:

1. A vehicle wheel of the character described, comprising a central rigid hub, a felly, a hub ring around, and spaced from the main hub and connected to said felly to support the latter, an inflatable tube mounted around the central hub and in the space between the same and said hub ring and resiliently supporting the latter in use, and means to guide the hub ring in its movement relative to the main hub, including outer side plates secured at their central portions to the main hub, and inner side plates secured at their inner portions to the said hub ring, said inner and outer side plates extending outwardly beyond the hub ring in the normal position of the parts, said inner side plates having radial depressed portions forming grooves adjacent to the outer side plates, and propelling blocks pivotally connected to the outer side plates and projecting into the grooves of the inner side plates and shiftable on their pivots wherein to automatically seat in flatwise relation against portions of the inner side plates irrespective of angular displacement of the hub ring under pressure.

2. A vehicle wheel of the character described, comprising a central rigid hub, a felly, a hub ring around, and spaced from the main hub and connected to said felly to support the latter, an inflatable tube mounted around the central hub and in the space between the same and said hub ring and resiliently supporting the latter in use, and means to guide the hub ring in its movement relative to the main hub, including outer side plates secured at their central portions to the main hub, and inner side plates secured at their inner portions to the said hub ring, said inner and outer side plates extending outwardly beyond the hub ring in the normal position of the parts, said inner side plates having series of radial depressed portions forming series of grooves adjacent the outer side plates, anti-friction members disposed in certain of said grooves to engage the inner faces of the outer side plates, anti-friction members disposed in the other of said grooves, and pivoted propelling blocks carried by the outer side plates and projecting within the latter grooves of the inner side plates to engage the anti-friction members therein and thus connect the inner and outer side plates for simultaneous rotation.

JAMES FINLEY KEMP.

Witnesses:
FRANK B. INGERSOLL,
F. S. YERGER.